Patented June 16, 1936

2,044,059

UNITED STATES PATENT OFFICE 2,044,059

METHOD OF COMPOUNDING RUBBER

William S. Calcott and William A. Douglass, Pennsgrove, N. J., assignors to E. I. du Pont de Nemours & Company, Wilmington, Del., a corporation of Delaware No Drawing. Application August 3, 1929, Serial No. 383,420

22 Claims. (Cl. 18—50)

This invention is concerned with new materials for use as preservatives or antioxidants for rubber and similar materials, and more particularly with the incorporation of certain types of hydroxy substituted secondary amines with the rubber, whereby a product is obtained which is unusually resistant to deterioration.

A number of different classes of compounds have heretofore been proposed for use with rubber to prevent deterioration, particularly in the presence of oxygen, and many of these have been found to have considerable merit.

We have now discovered that exceptionally valuable antioxidants for rubber are to be found in the class of compounds represented in the formula

X—R—NH—R'—Y in which R and R' are aryl groups, either alike or different, while X represents a hydroxy or alkoxy group, and Y represents hydrogen, a hydroxy or an alkoxy group.

Samples of rubber stocks have been subjected to aging tests for various periods of time with a large number of compounds of this general type.

In order to illustrate the effectiveness of compounds of this type as antioxidants, the following examples are presented showing the results obtained by employing para-hydroxy-diphenylamine, a typical compound. It is to be understood however that the scope of our invention is not to be limited to the particular conditions or proportions specified in the examples and that the results obtained by the use of the particular compound employed in the examples are merely illustrative of the antioxidant properties which this group of compounds has been found to exhibit as a class.

In the Example 1, 2 and 3, the efficiency of this type of compound is illustrated in three different types of stocks each of which were submitted to two different aging tests. Comparisons are shown between a stock containing no antioxidant, one containing an unsubstituted secondary amine, viz. phenyl-alpha-naphthylamine, and one containing para-hydroxy-diphenylamine. The tensile strength of the original material is compared with the strength after aging for 1, 2, 3, 4 and 5 days.

EXAMPLE 1

Stock: Rubber 100, ZnO 18.15, Sulphur 2.75, D. O. T. G. 0.5625

| | Orig. | Days in oven at 90° C. | | | | |
|---|---|---|---|---|---|---|
| | | 1 | 2 | 3 | 4 | 5 |
| Control | 2825 | 2125 | 1025 | 800 | 75 | 50 |
| 1% Phenyl-a-naphthyl-amine | 2775 | 3050 | 1525 | 1300 | 900 | 800 |
| 1% p(OH) diphenylamine | 3000 | 2750 | 2525 | 2075 | 2100 | 900 |

| | Orig. | Days in bomb at 70° C. 300# O₂ pressure | | | |
|---|---|---|---|---|---|
| | | 1 | 2 | 3 | 4 |
| Control | 2825 | 1725 | 625 | 150 | |
| 1% Phenyl-a-naphthyl-amine | 2775 | 2625 | 1575 | 1425 | 1050 |
| 1% pOH diphenylamine | 3000 | 2950 | 2275 | 1975 | 2100 |

EXAMPLE 2

Stock: Rubber 100, ZnO 5, Carbon black 40, D. O. T. G. 1, Sulphur 3.25

| | Orig. | Days in oven at 90° C. | | | | |
|---|---|---|---|---|---|---|
| | | 1 | 2 | 3 | 4 | 5 |
| Control | 3425 | 1375 | 1150 | 725 | 650 | 500 |
| 1% Phenyl-a-naphthyl-amine | 3850 | 2900 | 1925 | 1450 | 1250 | 1200 |
| 1% pOH diphenylamine | 4000 | 3325 | 2600 | 1825 | 1425 | 1400 |

| | Orig. | Days in bomb at 70° C. 300# O₂ pressure | | | |
|---|---|---|---|---|---|
| | | 1 | 2 | 3 | 4 |
| Control | 3425 | 800 | 475 | | |
| 1% Phenyl-a-naphthyl-amine | 3850 | 2750 | 1900 | 1575 | 1850 |
| 1% p(OH) diphenylamine | 4000 | 3350 | 2675 | 2175 | 2800 |

EXAMPLE 3

Stock: Rubber 100, ZnO 5, Sulfur 3, Whiting 40, D. O. T. G. 0.6

|  | Orig. | Days in oven at 90° C. | | | | |
|---|---|---|---|---|---|---|
|  |  | 1 | 2 | 3 | 4 | 5 |
| Control | 3150 | 2775 | 2325 | 1575 | 1575 | 1125 |
| 1% phenyl-a-naphthyl-amine | 3200 | 2800 | 2375 | 1950 | 1800 | 1400 |
| 1% p(OH) diphenylamine | 3150 | 3275 | 2975 | 2725 | 2550 | 2075 |

|  | Orig. | Days in bomb at 70° C. 300# O₂ pressure | | | |
|---|---|---|---|---|---|
|  |  | 1 | 2 | 3 | 4 |
| Control | 3150 | 2200 | 650 | 450 |  |
| 1% phenyl-a-naphthyl-amine | 3200 | 2150 | 2275 | 1925 | 1350 |
| 1% p(OH) diphenylamine | 3150 | 2325 | 2550 | 2225 | 2275 |

Para-hydroxy-diphenyl-amine

the compound employed in the above examples, represents a compound corresponding to the general formula $$X-R-NH-R'-Y$$

in which R and R' represent the same aryl nucleus (phenyl), X is OH and Y is H. In such compounds the phenyl groups may contain alkyl substituents as in p-hydroxy-p-methyl-diphenylamine.

Similar tests have shown that compounds of the type where R and R' represent the same aryl nucleus and X and Y both represent OH have comparable antioxidant properties. As an example of a compound of this type which has been tested may be mentioned para-para'-dihydroxy-diphenylamine

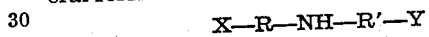

The corresponding di-naphthyl compounds also exhibit anti-oxidant properties.

Although the para hydroxy compounds are preferred, it will be apparent from the above that compounds in which the substituent groups are in other positions will have similar properties and may be employed instead.

Similar compounds in which R and R' represent different aryl radicals have been tested with like success. Examples of compounds of this type are the hydroxy-phenyl-naphthyl-amines as the meta and para - hydroxy - beta - naphthylamines. In the above compounds a hydroxy group is attached to the phenyl radical but compounds in which the naphthalene radical contains the hydroxy group are also adapted for use. Among such compounds may be mentioned 4-hydroxy-1-N-phenylnaphthylamine,

and 7(phenyl-amido) 2-hydroxy-naphthalene and 2(phenyl-amino) 1-hydroxy-naphthalene. Also, both the phenyl and naphthyl groups may contain a hydroxyl substituent. Typical compounds of this type which have been found to exhibit antioxidant properties include 3(2'-hydroxy-anilino) 2-hydroxy-naphthalene, as well as the following

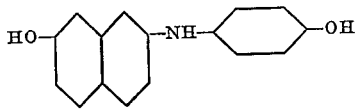

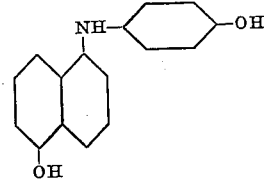

We have also tested compounds in which either X, or both X and Y are alkoxy groups, such for example as para-ethoxy-phenyl-alpha-naphthylamine

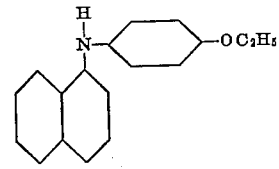

and p-p'-diethoxy-diphenylamine

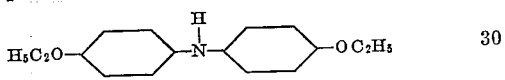

These compounds also are effective antioxidants for rubber, as has been shown by the appearance of samples aged in the oxygen bomb at 70° C. under 300 lbs. oxygen pressure. It is obvious that p-ethoxy-diphenylamine would also be effective, also compounds containing other alkoxy groups, such for example as methoxy phenyl alpha or beta-naphthylamine, or the two compounds indicated below

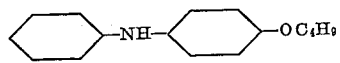

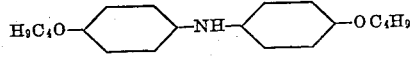

Compounds containing both a hydroxy and alkoxy group will also function as antioxidants, such for example as para-hydroxy-p'-ethoxy-diphenylamine. Phenyl-naphthyl and dinaphthyl compounds containing an alkoxy group may also be employed.

It will be evident from the above examples that a large number of compounds are adapted for use and come within the scope of the invention. We have shown the hydroxy-diphenylamines, both mono and di, to be effective, also the alkoxy-diphenylamines; and that compounds containing both an hydroxy and an alkoxy group are effective; also, that the phenyl nuclei may contain alkyl substituents in the ring. It will also be clear that similar derivatives, both alkoxy and hydroxy, of phenyl-a-napththylamine and phenyl-b-naphthylamine, are effective. Of these compounds, however, the hydroxy-diphenyl-amines represent our preferred embodiment.

The antioxidants may be incorporated into the rubber by any well known means, such as milling them into the stock upon the rolls of an ordinary mill. Moreover, they may be employed in various rubber compounds and it is therefore to be understood that the invention is not to be limited to any particular rubber compound. Also the proportions of antioxidant employed may be varied within wide limits although under ordinary cir-

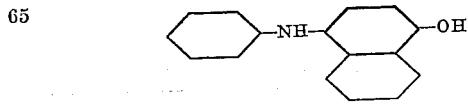

cumstances about 1% of the antioxidant based on the weight of the stock treated has been found to be highly satisfactory.

While we prefer to use antioxidants of this type by adding the antioxidant to the rubber mix prior to vulcanization, it is also possible to use them for treatment of vulcanized rubber where the antioxidant is either dissolved in a solvent or in vapor form. These materials are also effective in the preservation of certain other rubber-like materials, such as gutta-percha, balata, and synthetic rubber.

Vulcanized rubber containing the new antioxidants, even under the severe conditions encountered in the oxygen bomb, exhibits surprisingly slight loss in tensile strength and elasticity when compared to rubber of similar composition but containing no antioxidant.

As many apparent and widely different embodiments of this invention may be made without departing from the spirit thereof, it is to be understood that we do not limit ourselves to the foregoing examples or description except as indicated in the following claims.

We claim:

1. The method of preserving rubber which comprises treating rubber with an alkoxy substituted diphenylamine.

2. The method of preserving rubber which comprises treating rubber with an alkoxy substituted diarlyamine.

3. The method of preserving rubber which comprises treating the rubber with a di-arylamine in which at least one aryl ring carries as a substituent an alkoxy group in which the alkyl group contains at the most two carbon atoms.

4. The method of preserving rubber which comprises treating the rubber with a di-arylamine in which at least one aryl ring carries as a substituent a methoxy group.

5. The method of preserving rubber which comprises treating the rubber with a di-arylamine in which at least one aryl ring carries as a substituent an ethoxy group.

6. The method of preserving rubber which comprises treating the rubber with di-phenylamine in which at least one phenyl ring carries as a substituent in the para position an alkoxy group containing at the most two carbon atoms.

7. The method of preserving rubber which comprises treating the rubber with p-ethoxy-diphenylamine.

8. The method of preserving rubber which comprises treating the rubber with a phenyl-naphthylamine in which the phenyl ring carries as a substituent in the para position an ethoxy group.

9. The method of preserving rubber which comprises treating the rubber with p-ethoxy-phenyl-a-naphthylamine.

10. The method of preserving rubber which comprises treating the rubber with a di-aryl-amine in which each aryl ring carries as a substituent an alkoxy group containing at the most two carbon atoms.

11. The method of preserving rubber which comprises treating the rubber with di-phenyl-amine in which each phenyl ring carries as a substituent in the para position an alkoxy group containing at the most two carbon atoms.

12. The method of preserving rubber which comprises treating the rubber with p-p'-di-ethoxy-diphenylamine.

13. Rubber having incorporated therein as a preservative therefor an alkoxy substituted diphenylamine.

14. Rubber having incorporated therein as a preservative therefor an alkoxy substituted diarylamine.

15. Rubber having incorporated therein as a preservative therefor a diarylamine in which at least one aryl ring carries as a substituent an alkoxy group in which the alkyl group contains at the most two carbon atoms.

16. Rubber having incorporated therein as a preservative therefor a di-arylamine in which at least one aryl ring carries as a substituent a methoxy group.

17. Rubber having incorporated therein as a preservative therefor di-phenylamine in which at least one phenyl ring carries as a substituent in the para position an alkoxy group containing at the most two carbon atoms.

18. Rubber having incorporated therein as a preservative therefor p-ethoxy-diphenylamine.

19. Rubber having incorporated therein as a preservative therefor a phenyl-naphthylamine in which the phenyl ring carries as a substituent in the para position an ethoxy group.

20. Rubber having incorporated therein as a preservative therefor p-ethoxy-phenyl-a-naphthylamine.

21. Rubber having incorporated therein as a preservative therefor di-phenylamine, in which each phenyl ring carries as a substituent in the para position an alkoxy group containing at the most two carbon atoms.

22. Rubber having incorporated therein as a preservative therefor p-p'-diethoxy-diphenylamine.

WILLIAM S. CALCOTT.
WILLIAM A. DOUGLASS.